March 15, 1949.　　　　W. B. DEAN　　　　2,464,760
RAILWAY VEHICLE TRUCK MECHANISM
Filed Jan. 26, 1945　　　　　　　　2 Sheets-Sheet 1
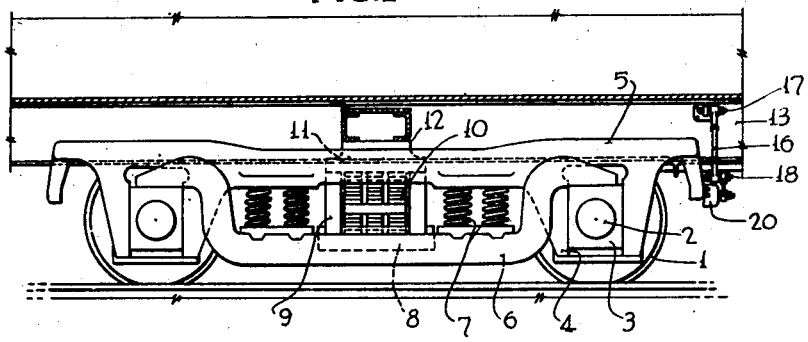
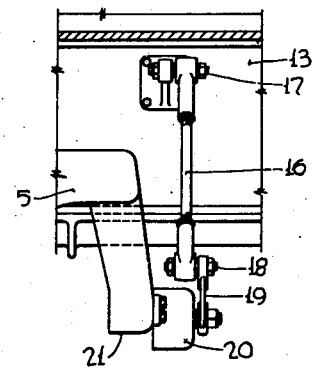
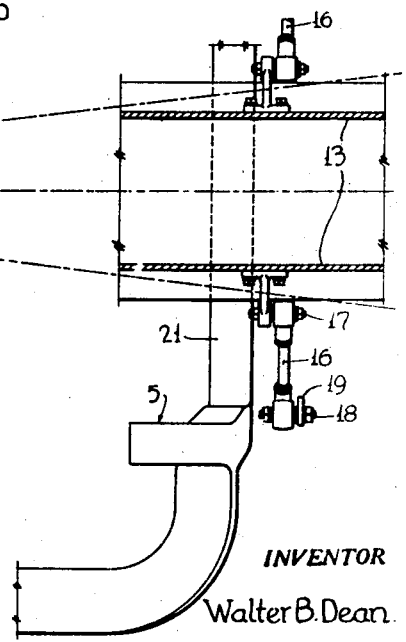
INVENTOR
Walter B. Dean
BY John P. Tarbox
ATTORNEY March 15, 1949.    W. B. DEAN    2,464,760
RAILWAY VEHICLE TRUCK MECHANISM
Filed Jan. 26, 1945    2 Sheets-Sheet 2
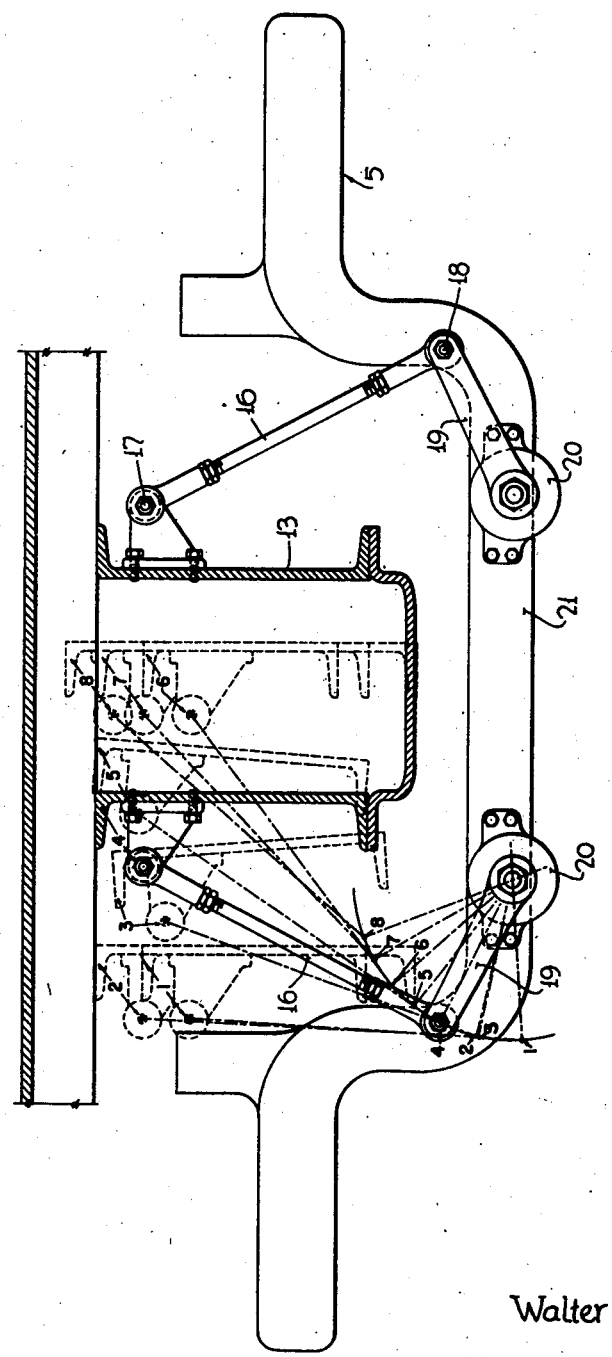
INVENTOR
Walter B. Dean
BY John P. Tarbox
ATTORNEY Patented Mar. 15, 1949

2,464,760

UNITED STATES PATENT OFFICE 2,464,760

RAILWAY VEHICLE TRUCK MECHANISM

Walter B. Dean, Narberth, Pa., assignor to The Budd Company, Philadelphia, Pa., a corporation of Pennsylvania Application January 26, 1945, Serial No. 574,705

6 Claims. (Cl. 105—199)

This invention relates to railway vehicle truck mechanism, particularly to truck frame stabilizing mechanism, and has for an object the provision of improvements in this art.

One of the particular objects of the invention is to provide unitary apparatus for stabilizing, i. e. damping or snubbing, a plurality of different movements.

Another object is to provide such shock absorbing mechanism which will not materially obstruct the required movements of parts.

Another object is to provide such mechanism which is of a simple durable nature, easily manufactured, installed and serviced.

More specifically it is an object to suppress or inhibit pitching or galloping about a horizontal transverse axis, rolling about a horizontal longitudinal axis, nosing about a vertical axis and side sway along a horizontal plane.

When a truck frame is interposed between frame-supporting and frame-supported spring systems, as is common in railway vehicle truck mechanism, it is subject to various synchronous or resonant cumulative movements which if not damped are likely to increase to the point of damage to the mechanism. These movements have heretofore been separately checked by various types of individual damping mechanisms; the present invention provides unitary means for damping a plurality or all of the frame movements and with each damping action substantially in proportion to the magnitude of the undesired proportion of movement which is desired to be damped.

The above and other objects and advantages of the invention will be apparent from the following description of an illustrative embodiment, reference being made to the accompanying drawings, wherein:

Figure 1 is a side elevation of a truck embodying the invention;

Figure 2 is a plan view, partly diagrammatic;

Figure 3 is an end elevation and diagram; and

Figure 4 is an enlargement of part of Figure 1.

The truck mechanism herein shown comprises wheels 1 with journals 2 carried by journal boxes 3 slidable in pedestals 4 of a frame 5. Equalizers 6 rest on the journal boxes and carry springs 7 which support the frame 5. A spring plank 8 is suspended from the frame by hangers 9, the plank carrying springs 10 which support a truck bolster 11. The bolster supports the superstructure, here a rail car body, by a center bearing 12. The body includes a center sill 13.

This is a known construction and when a truck frame is thus mounted it has a number of movements including a pitching movement about a horizontal transverse axis, a rolling movement about a horizontal longitudinal axis, a turning or nosing movement about a vertical axis, and a swaying movement in a horizontal plane. These are all essential movements but when the truck frame is mounted between resilient elements the movements may be accentuated by repetition or resonance until a dangerous amplitude is reached. The present invention provides damping means for maintaining these movements within safe limits.

Dampening means for one or another of these movements have been provided heretofore. The present invention provides unitary means for damping a number of the movements, the major damping effect being applied to the movement which is most likely to get beyond control and lesser damping effects being applied to the other movements.

In the specific form herein illustrated an element 16 of the damping means is arranged at a distance from the vertical plane of the transverse axis and at an angle to a vertical longitudinal plane. Preferably elements 16 are arranged in pairs at opposed angles on opposite sides of a central vertical longitudinal plane and also in symmetrical pairs on opposite sides of the vertical transverse axial lane. In the present instance the element 16 does not embody the damping or shock-absorbing means per se within its length but constitutes a rigid link which is attached at its upper end to the superstructure by a pivot pin 17 and is attached at its lower end by a pivot pin 18 to the end of an arm 19 of a rotary type shock absorber 20 which is mounted on a frame transom 21. In normal or central position the link 16 has a small inclination to the vertical, specifically here less than 30 degrees and more specifically about 24 degrees. The arm 19 makes about the same angle with a horizontal plane. The angle between the arm and link is therefore about 90 degrees.

As will be evident, a pitching or vertical movement about a horizontal transverse axis carries the shock absorber 20 directly downward and since it is located at a relatively great distance from the vertical transverse plane the movement and damping action are considerable for a relatively small opposing force. Also, as clearly appears from Figure 3, the angular arrangement of the element 16 as well as the arm 19 causes resistance to be interposed to rolling, nosing and swaying movements, i. e. lateral movements, though of less magnitude than that opposing the pitching movement. Of course, by increasing the angle to the vertical the opposition to certain movements is increased and that to others decreased.

In Figure 3 a number of positions of parts are illustrated and indicated by paired references 1 to 8. It will be understood that there are similar positions on the other side of the longitudinal axis.

It is thus seen that the invention provides simple unitary means for damping both vertical and lateral movements in an effective manner without disturbing to any material extent the normal and required movements of parts.

While one embodiment of the invention has been described for purposes of illustration, it is to be understood that there may be various embodiments within the limits of the prior art and the scope of the subjoined claims.

What is claimed is:

1. In a vehicle in combination, a truck frame resiliently mounted between an undercarriage and a superstructure so as to have pitching movement about an intermediate horizontal transverse axis along which the superstructure is supported, rolling movement along an intermediate horizontal longitudinal axis along which the superstructure is supported, and turning or nosing movement about an intermediate vertical axis where vertical planes through the transverse and longitudinal axes intersect each other, and shock absorbers mounted between the truck frame and the superstructure at a distance on each side of the transverse vertical plane and on each side of the longitudinal vertical plane, each shock absorber comprising a shock absorber element, an arm connected to the shock absorber element, and a link connected to the arm, the link, arm and shock absorber element being connected between the truck frame and the superstructure, said link in stable position being so disposed as to make a substantial angle outward from the longitudinal vertical plane, and the arm in stable position being so disposed as to make a substantial angle outward from the longitudinal vertical plane and a substantial but smaller angle away from a horizontal plane through the transverse axis to its point of connection with the link, the end of the arm which is connected with the link being further from the longitudinal vertical plane than its other end, whereby each of the several shock absorbers effectively damps all three of said pitching, rolling and turning movements from the start of movement from the stable position of rest but damps the pitching movement more than the rolling and turning movements and damps the rolling movement more than the turning movement.

2. In a vehicle in combination, a truck frame resiliently mounted between an undercarriage and a superstructure so as to have pitching, rolling and turning movement about transverse, longitudinal and vertical intersecting axes, a shock absorber connected between said frame and superstructure at a distance from a vertical plane through the transverse axis and at one side of a vertical plane through the longitudinal axis, said shock absorber including a link and arm hinged together and a shock absorber element associated therewith to immediately oppose any one of the three said movements between the frame and superstructure from a given stable position, the link and arm in stable position making an angle of approximately 30 degrees with vertical and horizontal planes respectively and approximately 90 degrees with each other on the side toward the vertical longitudinal axial plane.

3. In a vehicle in combination, a truck frame resiliently mounted between an undercarriage and a superstructure so as to have pitching, rolling and turning movement about transverse, longitudinal and vertical intersecting axes, a superstructure above and supported on said truck adjacent the intersection of said transverse, longitudinal and vertical axes, said superstructure including a longitudinal center sill of considerable depth, said truck frame having an end transom located at a distance from the point of support of the superstructure on the truck, and a shock absorber connected between the superstructure and the end transom on one side of the center sill and to one side of the central longitudinal vertical plane thereof, said shock absorber including a link pivotally connected to the superstructure near the upper part of the center sill and in central position being inclined downwardly and outwardly at a relatively small angle from the central vertical plane of the center sill and at a relatively large angle from the horizontal and at its lower end being connected to a part carried by said truck frame end transom, whereby a single shock absorber element may by the disposition of said link inhibit all of the movements of pitching, rolling and turning immediately upon movement from a central position, with greatest resistance to pitching movement and least resistance to turning movement.

4. In a vehicle in combination, a truck frame resiliently mounted between an undercarriage and a superstructure so as to have pitching, rolling and turning movement about transverse, longitudinal and vertical intersecting axes, a superstructure above and supported on said truck adjacent the intersection of said transverse, longitudinal and vertical axes, said superstructure including a longitudinal center sill of considerable depth, said truck frame having an end transom located at a distance from the point of support of the superstructure on the truck, and a shock absorber connected between the superstructure and the end transom on each side of the center sill, said shock absorbers each including a link pivotally connected to the superstructure near the upper part of the center sill and to one side of the central longitudinal vertical plane thereof and in central position being inclined downwardly and outwardly at a relatively small angle from the central vertical plane of the center sill and at a relatively large angle from the horizontal and at its lower end being connected to a part carried by said truck frame end transom, whereby on each side of the center sill a single shock absorber element may by the disposition of said link inhibit all of the movements of pitching, rolling and turning immediately upon movement from a central position, with greatest resistance to pitching movement and least resistance to turning movement.

5. In a vehicle in combination, a truck frame resiliently mounted between an undercarriage and a superstructure so as to have pitching, rolling and turning movement about transverse, longitudinal and vertical intersecting axes, a superstructure above and supported on said truck frame adjacent the intersection of said transverse, longitudinal and vertical axes, and a shock absorber connected between the superstructure and a truck frame transom at a longitudinal distance from the point of support, said shock absorber including a link pivotally connected to the superstructure at a distance to one side of a central longitudinal vertical plane, said link being inclined outwardly and downwardly from said central vertical plane at such an angle as related to other parts to which it is connected that in central position of the truck frame it provides greatest resistance to pitching movement and least but considerable resistance to turning movement, and in the maximum turned position of the superstructure toward the side on which the link is located the shock absorber providing greatest resistance to pitching and substantially no resistance to turning and in the maximum turned position of the superstructure toward the side away from the link the shock absorber providing less resistance to pitching than in other positions but greatest resistance to turning movement of the truck.

6. Apparatus as set forth in claim 5, further characterized by the fact that a shock absorber is located on each side of the central plane with the links symmetrically inclined downwardly and outwardly from the central plane.

WALTER B. DEAN.

REFERENCES CITED

The following references are of record in the file of this patent:

UNITED STATES PATENTS

| Number | Name | Date |
| --- | --- | --- |
| 1,325,226 | Adams | Dec. 16, 1919 |
| 1,333,040 | Schwantes | Mar. 9, 1920 |
| 2,150,896 | Muchnic | Mar. 21, 1939 |
| 2,153,389 | Perkins | Apr. 4, 1939 |
| 2,352,039 | Travilla, Jr. | June 20, 1944 |